(12) United States Patent
Engel et al.

(10) Patent No.: US 12,293,263 B2
(45) Date of Patent: May 6, 2025

(54) SYSTEM, METHOD, AND MODEL STRUCTURE FOR USING MACHINE LEARNING TO PREDICT FUTURE SPORT OUTCOMES BASED ON MATCH STATE TRANSITIONS

(71) Applicant: SIMPLEBET LLC, Boston, MA (US)

(72) Inventors: Kyle Engel, New York, NY (US); Chris Flynn, New York, NY (US); Henry Sorsky, New York, NY (US)

(73) Assignee: SIMPLEBET LLC, Boston, MA (US)

( * ) Notice: Subject to any disclaimer, the term of this patent is extended or adjusted under 35 U.S.C. 154(b) by 1079 days.

(21) Appl. No.: 17/184,132

(22) Filed: Feb. 24, 2021

(65) Prior Publication Data

US 2022/0164702 A1 May 26, 2022

Related U.S. Application Data

(60) Provisional application No. 63/116,573, filed on Nov. 20, 2020.

(51) Int. Cl.
*G06N 7/01* (2023.01)
*G06F 17/18* (2006.01)
*G06N 20/00* (2019.01)

(52) U.S. Cl.
CPC .......... *G06N 20/00* (2019.01); *G06F 17/18* (2013.01); *G06N 7/01* (2023.01)

(58) Field of Classification Search
CPC .......... G06N 20/00; G06N 7/01; G06F 17/18
See application file for complete search history.

(56) References Cited

U.S. PATENT DOCUMENTS

2019/0228290 A1* 7/2019 Ruiz ............... G06N 3/042

OTHER PUBLICATIONS

Wei et al., "Predicting Shot Locations in Tennis using Spatiotemporal Data", IEEE, 2013 (Year: 2013).*
Wei et al., "Predicting Shot Locations in Tennis using Spatiotemporal Data" (Year: 2013).*
Bunker et al., "The Application of Machine Learning Techniques for Predicting Results in Team Sport: A Review", 2019. (Year: 2019).*
Fernandez et al., "A framework for the ne-grained evaluation of the instantaneous expected value of soccer possessions", Nov. 18, 2020. (Year: 2020).*
Lamsal et al., "Predicting Outcome of Indian Premier League (IPL) Matches Using Machine Learning", 2020 (Year: 2020).*
Wei et al., Predicting Shot Locations in Tennis Using Spatiotemporal Data, International Conference on Digital Image Computing: Techniques and Applications (DICTA), Nov. 2013. (Year: 2013).*
Fernandez et al., A framework for the fine-grained evaluation of the instantaneous expected value of soccer possessions, Nov. 2020. (Year: 2020).*

* cited by examiner

*Primary Examiner* — Marshall L Werner
(74) *Attorney, Agent, or Firm* — ICE MILLER LLP

(57) ABSTRACT

A system and method using machine learning prediction that estimates future sport outcomes by mathematically representing current and future match states as a Bayesian network parameterized by underlying machine learning models.

20 Claims, 5 Drawing Sheets

SYSTEM, METHOD, AND MODEL STRUCTURE FOR USING MACHINE LEARNING TO PREDICT FUTURE SPORT OUTCOMES BASED ON MATCH STATE TRANSITIONS

CROSS-REFERENCE TO RELATED APPLICATIONS

This application claims priority from U.S. Provisional Application 63/116,573 filed Nov. 20, 2020, having the title A MACHINE LEARNING SYSTEM TO PREDICT FUTURE SPORT OUTCOMES BASED ON MATCH STATE TRANSITIONS, the content of which are hereby incorporated by reference in its entirety.

TECHNICAL FIELD OF THE DISCLOSED EMBODIMENTS

The presently disclosed embodiments generally relate to predictive modeling and machine learning and, more particularly, to a system, method, and model structure for using machine learning to predict future sport outcomes based on match state transitions.

BACKGROUND

Stochastic models are probabilistic models that have wide applications in sciences, signal processing, information theory, and finance. Markov chains, which are specific types of stochastic models, are used to model discrete or continuous time processes in which a process transitions between states. A key property of Markov chains is that they are "memoryless". This means only the present state is relevant in predicting future states—in other words, the states and transitions leading up to the present state do not matter.

Bayesian networks are probabilistic models that similarly have wide applications in sciences and finance. Generally, Bayesian networks are used to model probability distributions and conditional dependencies between variables.

SUMMARY OF THE DISCLOSED EMBODIMENTS

The presently disclosed embodiments comprise a machine learning prediction system which is based on a Bayesian network model structure which works similar in concept to Markov chain models but overcomes the undesirable "memoryless" property of Markov chain models.

This system can be used to produce accurate estimates of future sport outcomes an arbitrary number of steps into the future. For example, in a Major League Baseball (MLB) game, while Batter 1 is batting, we may wish to predict the probability that Batter 4 hits a single. The probability that Batter 4 hits a single depends on the results of Batter 1, Batter 2, and Batter 3, and it also depends on how the score, outs, and runners on base change as a result of the outcomes of Batter 1, Batter 2, and Batter 3 at-bats. Generally, the presently disclosed embodiments can be used to generate accurate probability distributions at arbitrarily long steps into the future in systems that have measurable and statistically dependent state spaces.

In one embodiment, A system for predicting future outcomes in a sporting match of a sport of interest based on match state transitions, the system comprising: a transition machine learning model trained on historical data from past matches in the sport of interest; a state updater trained on historical data from past matches in the sport of interest; a final outcome machine learning model trained on historical data from past matches in the sport of interest; and a total probability predictor; wherein the system executes the following steps: inputting an initial match state $S_0$ of the sporting match into the transition machine learning model; generating, using the transition machine learning model, predicted probability distributions on a plurality of transition outcomes $PT_0$-$PT_i$, where i is an integer; inputting the plurality of transition outcomes $PT_1$ into the state updater; generating, using the state updater, a plurality of predicted probability distributions on future states, $S_1$-$S_i$, where i is an integer, conditioned on each possible transition outcome, $PT_i$; inputting the plurality of predicted probability distributions on future states $S_i$ into the final outcome machine learning model; generating, using the final outcome machine learning model, predicted probability distributions on a desired final outcome, PF; inputting $PT_i$, $S_i$, and PF into the total probability predictor; and generating, using the total probability predictor, parameters for a Bayesian network to produce a probability distribution of a desired outcome occurring in a future match state.

Other embodiments are also disclosed.

BRIEF DESCRIPTION OF DRAWINGS

The embodiments and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION OF THE DISCLOSED EMBODIMENTS

Figure 1:
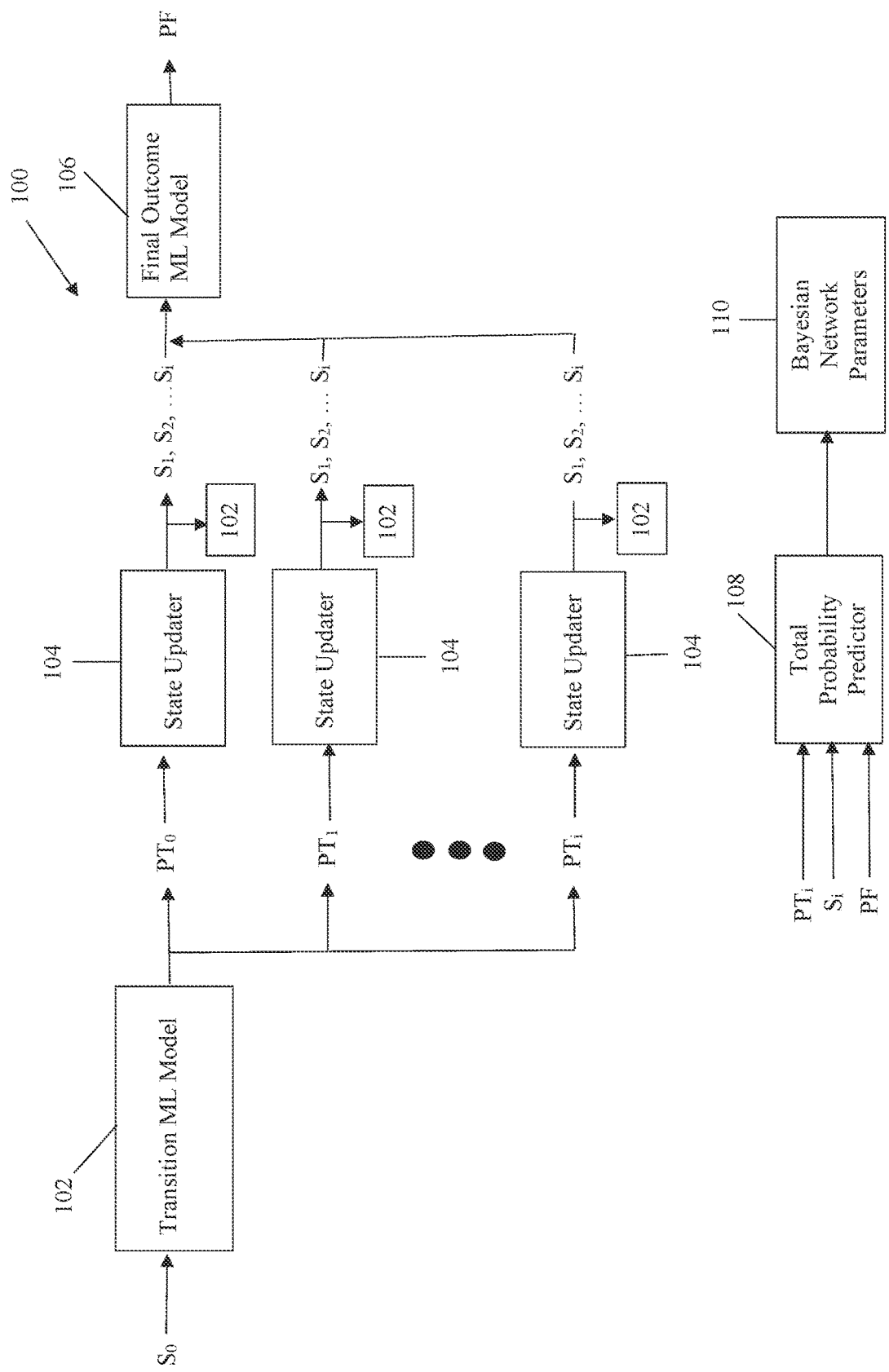
FIG. 1 is a schematic diagram of a computer-implemented system comprising machine learning models used to predict future sport outcomes according to an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In some embodiments, the disclosed system has four main components: a Transition Machine Learning (ML) Model, a State Updater, a Final Outcome ML Model and a Total Probability Predictor. The State Updater and Total Probability Predictor components provide structure around the Transition ML Model and the Final Outcome ML Model. The Transition ML Model and the Final Outcome ML Model are trained on historic statistical data from past matches in the sport of interest. All of these components are implemented as software running on general purpose computing devices, as will be understood by those having skill in the art.

In some embodiments, the process functions in two stages. First, we parameterize a Bayesian network by iteratively using Transition ML Model, the State Updater, and Final Outcome ML Model, shown collectively in FIG. 1 as system 100, to generate probability distributions. Second, we use the Total Probability Predictor to perform statistical inference on the Bayesian network, furling all conditional probabilities to produce a probability distribution on the desired outcome.

In one embodiment, the first stage functions as follows, with continuing reference to FIG. 1. The starting point is an initial match state, $S_0$. First, use the Transition ML Model 102 to generate predicted probability distributions on transition outcomes, $PT_0$-$PT_i$, where i is an integer Then, use the State Updater 104 to generate predicted probability distributions on future states, $S_1$, $S_2$, ... $S_i$, where i is an integer, conditioned on each possible transition outcome, $PT_i$. Repeat this process of using the Transition ML Model 102 to generate probability distributions on transition outcomes and using the State Updater 104 to generate probability distributions on future states, for an arbitrary number of states into the future. For example, the new "match states" (output of State Updater 104) may loop back and are fed into the Transition ML Model 102. This loop happens N−1 times, where N is the number of steps into the future desired for the final outcome. Therefore, if we only care about outcomes one step into the future, there will be no loop (N−1=0). But, if we care about outcomes two steps into the future, there will be one loop (N−1=1). Finally, on the last step, use the Final Outcome ML Model to generate predicted probability distributions on the desired final outcome, PF. Each of these intermediate probability distributions ($S_i$, $PT_i$, and PF) parameterize a Bayesian network 110. For example, suppose the final outcome PF is the probability that the batter three at-bats into the future will score a run. In this example, N=3 (three steps into the future) and the outputs of the State Updater 104 will be fed back to the Transition ML Model 102 in two loops before the Final Outcome ML Model can generate the final outcome PF for this outcome on interest.

In the second stage, use the Total Probability Predictor 108 to furl all conditional probabilities into a single probability distribution. This probability distribution represents the probabilities of desired outcomes occurring, the desired number of steps into the future. It is the Total Probability Predictor 108 that uses the intermediate probability distributions ($S_i$, $PT_i$, and PF) to parameterize a Bayesian network 110.

All of the components 102, 104 and of the model of FIG. 1 are trained on actual results from prior real-life games in the sport of interest.

Transition ML Model 102

The Transition ML Model 102 is a machine learning model that predicts probability distributions at the same resolution in which the modelled system takes steps or progresses. For example, treating an MLB game as the system, the system may progress at the pitch-level or at the at-bat-level, for example. Therefore, the Transition ML Model 102 in this system can predict pitch results or at-bat results. The resulting probability distributions may have classes "ball", "strike", "in play" for the pitch-level Transition ML Model 102 predictions, or "hit", "out", "other" for the at-bat level Transition ML Model 102 predictions. The choice of resolution on the Transition ML Model 102 depends on the desired interpretation of the system's output. For example, if a prediction three at-bats into the future is desired, then the Transition ML Model 102 may operate at the at-bat level. Similarly, if a prediction three pitches into the future is desired, then the Transition ML Model may operate at the pitch-level.

The Transition ML Model 102 is very similar in concept to the Final Outcome ML Model discussed hereinbelow (and in some cases they can be identical). They may be trained on the same historical data (batter statistics, pitcher statistics, matchups, outs, balls, strikes, runners on base, etc., to name just a few non-limiting examples in the MLB example). The difference is that the Transition ML Model 102 predicts probability distributions on the outcome that the system transitions on, whereas the Final Outcome ML Model predicts probability distributions for the desired final outcome. For baseball, the system may transition on plate appearances, for example, so the Transition ML Model 102 may predict probabilities of singles, doubles, walks, outs, etc. When the desired final outcome is something like "plate appearance result for the batter on-deck", then the Final Outcome ML Model may be identical to the Transition ML Model 102, since the system in this example transitions on the same outcome desired for the final outcome.

The outputs of the Transition ML Model are provided as inputs to the State Updater 104.

State Updater 104

There are multiple methods by which the State Updater 104 can update match states. Three such embodiments are disclosed herein, although those skilled in the art will recognize in view of the present disclosure that additional methods may also be used. The first two embodiments apply to match state variables that depend on the Transition ML Model 102. The final embodiment does not.

In a first embodiment, the State Updater 104 can enumerate all possible initial match state variables and Transition ML Model 102 outcomes and use empirical data (e.g., probability distributions based on actual results from prior real-life games in the sport of interest) to extrapolate the expected future match states. In this first embodiment, the output probabilities are empirical probabilities (rather than predicted probabilities) taken from the past based on past base rates. Therefore, the probabilities in this first embodiment are not the output of a machine learning model. For example, in an MLB game, a simple initial match state may be "runner on first base, no runner on second base, no runner on third base". An example of a Transition ML Model 102 outcome may be "single". In this example, the State Updater would take this information and extrapolate probability distributions on future states if the batter hits a single, which may look something like this: 70% "runner on first base, runner on second base, no runner on third base", 25% "runner on first base, no runner on second base, runner on third base", etc. In other words, when there's only a runner on first base, and the current batter hits a single, the most likely following match states are "runner on first and second base" or "runner on first and third base".

Note that these probability distributions on future match states are computed for each Transition ML Model 102 outcome. Therefore, a full example of the output of the State Updater 104 may look like the following:

Example of Transition ML Model 102 Output:
    {Single: 20%, Double: 10%, Triple: 1%, Home Run: 5%, Anything Else: 64%}

Example of Possible Future States:
    State_1: {Outs: 0, Runner on First: No, Runner on Second: No, Runner on Third: No}
    State_2: {Outs: 1, Runner on First: No, Runner on Second: No, Runner on Third: No} ... (In the "state space" defined here, there are 24 different combinations of "state", outs from 0-2, runners on base yes/no for each base, therefore 3*2*2*2=24) . . . .
State_24: {Outs: 2, Runner on First: Yes, Runner on second: Yes, Runner on third: Yes}.
Example of State Updater 104 Output: {State_1: 5%, State_2: 0%, . . . , State_24: 1%}

The enumeration method may be best used when match state variables are discrete and do not take on many unique values, since the "state space" can get huge if the state variables take on a lot of unique values.

In a second embodiment, the State Updater 104 itself can use a meta-ML model to predict future match states. This method involves building a machine learning model based on past match states (general historical data from other games) and Transition ML Model 102 outcomes to predict future match states. For example, if a pitcher's total pitch count is 20, and he walks the batter, the meta-ML model of State Updater 104 may predict something like this for the pitcher's total pitch count for the next batter: 10% 24, 15% 25, 25% 26, 35% 27, etc. The meta-ML model method may be best used with match state variables that take on many unique values.

In a third embodiment, the State Updater 104 can simply retrieve pre-computed information for the following match state. This method is suitable when the following match state does not depend on the current state and is known at the time of the current match state. For example, the on-deck batter's batting average may be information required for the future match state. The on-deck batter's batting average doesn't depend on the result of the current at-bat, so the State Updater 104 can simply retrieve the on-deck batter's batting average to construct a future match state.

It will be appreciated that the State Updater 104 may employ combinations of these approaches, with or without implementing additional approaches, to construct a future match state.

Final Outcome ML Model 106

The Final Outcome ML Model is a machine learning model that predicts probability distributions for a desired final outcome PF. In some embodiments, the Final Outcome ML Model may be identical to the Transition ML Model 102 if the system steps at the same outcome as the desired final outcome. For example, the Transition ML Model 102 may predict at-bat results (because the system progresses at the at-bat level), such as Hit, Out, or Other, and the Final Outcome ML Model may also predict at-bat results (because we may want the at-bat probability distributions a number of steps into the future).

In other embodiments, the Final Outcome ML Model may be a separate model from the Transition ML Model 102. If it is desired to know probabilities of future outcomes for an outcome different than the outcome at which the match state transitions, then the Transition ML Model 102 and the Final Outcome ML Model are different. For example, the Transition ML Model 102 may predict pitch results (because the system progresses at the pitch level), and the Final Outcome ML Model may predict at-bat results (because we may want the at-bat probability distributions a number of steps into the future). The Final Outcome ML Model may extrapolate from future pitch level states provided by the State Updater 104 to predict future at-bat results. Similarly, it may be desired to know the probabilities of future at-bats ending in 1 pitch, 2 pitches, 3 pitches, etc. In this example, the match states are still transitioning at the at-bat level, so the Transition ML Model 102 is still predicting probabilities of at-bat results (hit, out, other). However, the Final Outcome ML Model is predicting probabilities of at-bat pitch counts (1, 2, 3, 4, etc.).

Summary of the System 100 Operation

Figure 2:
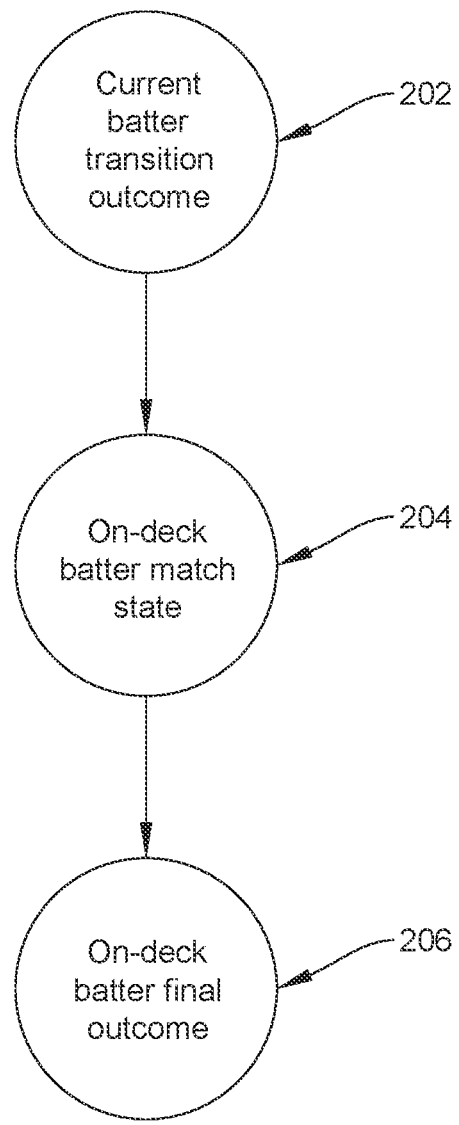
FIG. 2 is a schematic high-level Bayesian network diagram summarizing the operations of the system of FIG. 1 for an MLB at-bat match state predictor.
Figure 3:
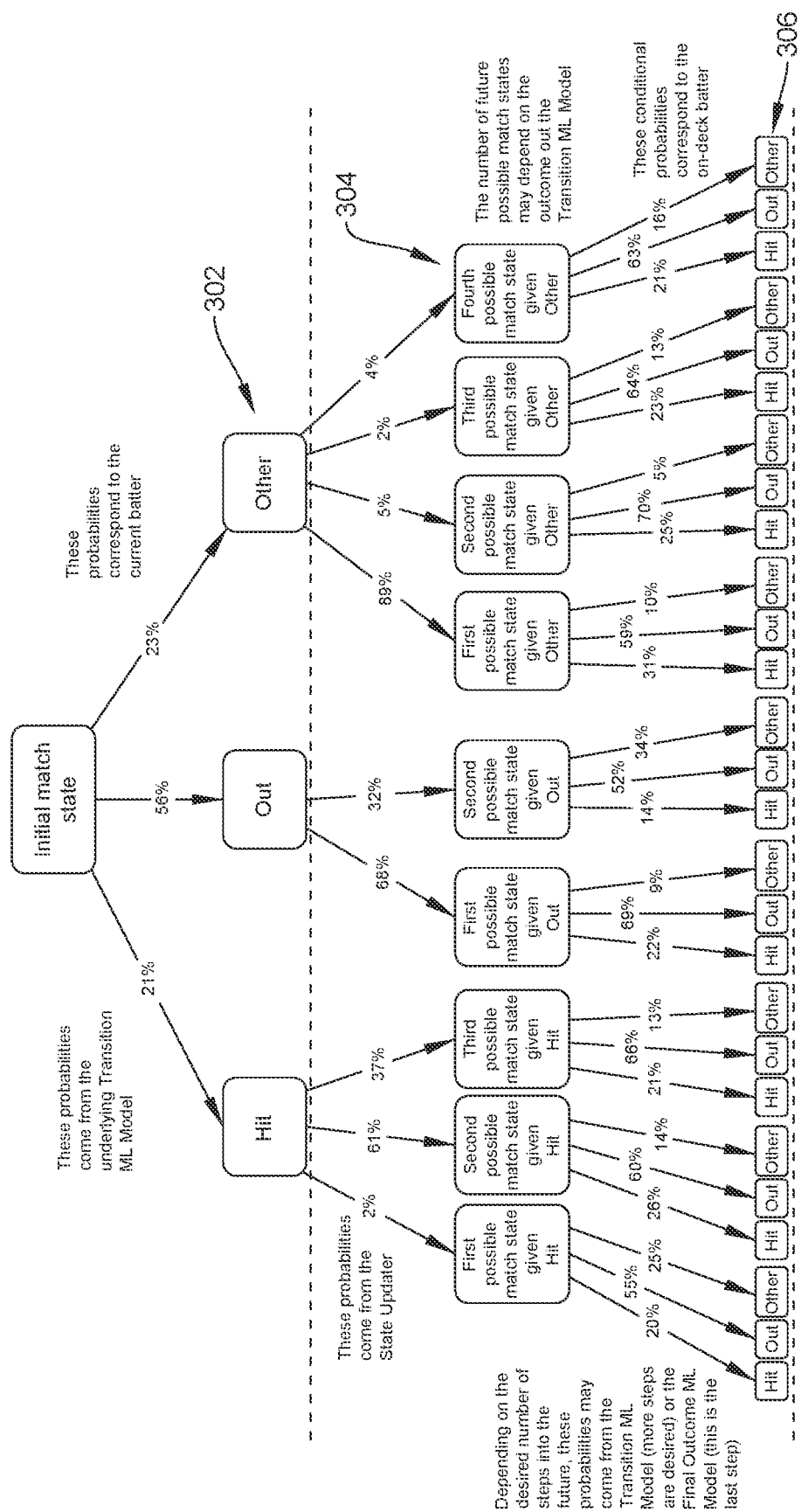
FIG. 3 is a schematic process flow diagram showing a more detailed view of the Bayesian network of FIG. 2.

Referring now to FIG. 2, there is shown a schematic high-level Bayesian network diagram summarizing the operation of the Transition ML Model 102, the State Updater 104, and the Final Outcome ML Model for an MLB at-bat match state predictor. Each circle is a random variable. FIG. 3 schematically illustrates a more detailed view of the Bayesian network of FIG. 2 after the system 100 has produced its outputs. In block 202, the random variable is current at-bat batter transition outcome (i.e., hit, out, or other). The output of the Transition ML Model 102 is a realization of the probability distribution of the transition outcome for the current at-bat batter. As can be seen in FIG. 3 at 302, the Transition ML Model 102 has determined that the probability of a hit is 21%, the probability of an out is 56%, and the probability of another outcome is 23%. These probabilities come from the Transition ML Model 102 and apply to the current batter (who is at bat in the initial match state).

In block 204 of FIG. 2, the random variable is the match state when the on-deck batter is at bat (i.e., a time in the future from the current match state). Using the possible transition outcomes generated by the Transition ML Model 102 (hit, out, or other), the State Updater 104 outputs a realization of this random variable, the probability of each possible future match state. Future match states depend on the outcome of the current batter, thus the State Updater 104 takes as input the Transition ML Model 102 output. The possible future match states (along with their probabilities of occurring) when the on-deck batter takes the plate are shown at 304 in FIG. 3. Although FIG. 3 illustrates a system that predicts only one step into the future, the State Updater 104 may output possible future match states any desired number of steps into the future by feeding back one predicted match state to the Transition ML Model 102 (as shown in FIG. 1), and obtaining the probability distribution of possible transitions from such predicted future match state from the Transition ML Model 102. These transition outcomes may then be used by the State Updater 104 to predict the probabilities of possible future match states one additional step into the future. This process can be repeated as many times as desired to predict the probability of any future match state as many steps into the future as desired.

Finally, in block 206 of FIG. 2, the random variable is the on-deck batter final outcome (i.e., predicting the outcome of the on-deck batter's future at-bat). Using each possible future match state generated by the State Updater 104 as input, the Final Outcome ML Model outputs a realization of this random variable, the probability of hit, out, or other for the on-deck batter's future at-bat. The final outcome of the on-deck batter's future at-bat depends on the future match state that exists when the on-deck batter takes the plate, thus the Final Outcome ML Model takes as input the State Updater 104 output. The possible future outcomes when the on-deck batter completes his/her at-bat are shown at 306 in FIG. 3. Any of these possible future outcomes 306 may be selected as the desired final outcome PF that is output by the Final Outcome ML Model 106.

It will be appreciated that, although the examples in the present description related to MLB games, the presently disclosed and claimed embodiments may be applied to any sporting match. The specific form of the Bayesian network may change depending on the application. To give a few examples, different applications may change the number of possible outputs in the ML models (and their names), the variables that define match state, and the depth of the network.

Total Probability Predictor

There are disclosed herein two embodiments by which the Total Probability Predictor 108 can compute the desired probability distributions for future outcomes a number of steps into the future, although those skilled in the art will recognize in view of the present disclosure that additional methods may also be used. Each of the probability distributions created by the Transition ML Model 102 ($PT_i$), the Statue Updater 104 ($S_i$), and the Final Outcome ML Model 106 (PF) are used as inputs to the Total Probability Predictor 108.

Each of the probability distributions created by the Transition ML Model 102 (PTi), the Statue Updater 104 (Si), and the Final Outcome ML Model (PF) are used to parameterize a Bayesian network 110 which captures the conditional probabilities of each possible outcome. The Total Probability Predictor 108 is then used to compute the final desired probability distributions.

For example, each probability shown in FIG. 3 is an input to the Total Probability Predictor 108. The probabilities shown in FIG. 3 are all "conditional" on what happened in the previous step. For example, take the "Hit" outcome to the very bottom-left of the figure. To arrive here, the current batter got a Hit (23%), the match state transitioned to its first possible state given that hit (2%), and then the on-deck batter also got a hit (20%). Therefore, the probability of this happening is 0.23*0.02*0.20=0.092%, which is really low. But, there are other possible situations in which the on-deck batter can get a hit. What we really care about is the "total probability," which is the probability of the on-deck batter getting a hit under all possible situations. The probabilities of each possible pathway to arriving at a hit (there are 9) is summed by the Total Probability Predictor 108 to get the "total probability." Therefore, the Final Outcome ML Model has determined the last layer of probabilities for each possible final outcome, but they are conditional on the previous states and transition outcomes. The Total Probability Predictor 108 takes all of those conditional probabilities mentioned above and outputs unconditional probabilities. It answers the question "What is the probability that the on-deck hitter gets a hit?"

In a first embodiment, the Total Probability Predictor 108 may perform an exact calculation. This method is suitable when the Transition ML Model 102 and the Final Outcome ML Model do not contain many classes in their respective outcome variables and when the number of steps into the future is small, for example. The exact calculation can be computed using matrix multiplication and linear algebra by representing the Bayesian network 110 with tensor data structures, or it can be computed using recursive calculations by representing the Bayesian network 110 with tree data structures, to name just two non-limiting examples. When the Transition ML Model 102 and the Final Outcome ML model contain many classes, and/or the number of desired steps into the future is large, for example, then the exact calculation may consume large amounts of computer memory, such as random access memory (RAM).

In a second embodiment, the Total Probability Predictor 108 may perform an approximate calculation. This method is suitable when the Transition ML Model 102 and/or the Final Outcome ML model do contain many classes in their respective outcome variables, and/or when the number of steps into the future is large, for example. The approximate calculation can be computed using Monte Carlo methods, for example. Performing the approximate calculation may take longer computation time, but it does not require the same computer memory resources as the exact calculation.

Example 1

MLB Application

In an MLB game, we may wish to predict the pitch count of an at-bat, for the current batter, the on-deck batter, and the in-the-hole batter. For this example, say that pitch counts can be "1", "2", or "3+". The Final Outcome ML Model predicts probability distributions on pitch counts. The Transition ML Model 102 predicts probability distributions on at-bat results. Say that at-bat results can be "hit", "out", or "other". Finally, we define match state variables as number of outs, runner on $1^{st}$ base, runner on $2^{nd}$ base, and runner on $3^{rd}$ base. For simplicity, we symbolize the match state as a vector. For example, take (1, 1, 0, 0) to mean one out, runner on $1^{st}$ base, and no runners on $2^{nd}$ or $3^{rd}$ base.

Say the starting match state is 0 outs, no one on base (0, 0, 0, 0). Start by using the Transition ML Model 102 to predict the probability distribution of at-bat results, which may produce:

Hit: 25%

Out: 65%

Other: 10%

The probabilities produced by the Transition ML Model 102 are dependent on the batters and pitchers. For example, better batters would have higher probabilities of hits. The probabilities here are determined by a machine learning model that is trained on historical data.

Then, use the State Updater 104 to extrapolate future match states for each possible at-bat result. Using the match state convention from above:

If "Hit"→(0, 1, 0, 0): 75%, (0, 0, 1, 0): 10%, (0, 0, 0, 1): 5%, (0, 0, 0, 0) 5%, (1, 0, 0, 0): 5%.

These probabilities are output by the State Updater 104. These are the probabilities in FIG. 3 associated with future match states 304. The State Updater 104 does not need to know the probabilities of a single, double, etc. It just needs to know what the possible outcomes are. The State Updater 104 knows that if a single happens, then possible futures states are A, B, C with associated probabilities, if a double happens, then possible future states are X, Y, Z, with associated probabilities, etc.

If "Out"→(1, 0, 0, 0): 100%.

If "Other"→(0, 1, 0, 0): 98%, (0, 0, 1, 0): 2%.

For each of the above possible future match states, use the Final Outcome ML Model to compute predicted probability distributions on pitch count. For example, a (0, 0, 0, 1) match state may produce:

1 pitch: 10%

2 pitches: 10%

3+ pitches: 80%

Finally, use each probability distribution from above to parameterize a Bayesian network 110 which captures the conditional probabilities of each possible outcome. Use the Total Probability Predictor 108 to compute the final desired probability distributions. The output may be something like this:

Pitch Count of On-Deck Batter:
 1 pitch: 12%
 2 pitches: 7%
 3+ pitches: 81%

Example 2

Bayesian Network Modeling (MLB At-Bat Model)

Bayesian networks are a powerful inference tool, in which a set of variables are represented as nodes, and the lack of an edge represents a conditional independence statement between the two variables, and an edge represents a dependence between the two variables. We would like to use one MLB at-bat model to predict any number of future at-bat outcomes. We can build a Bayesian network around the conditional probabilities of moving from one at-bat result to any future at-bat result. In real life, these conditional probabilities come from the output of an at-bat model (the Transition ML Model 102) with new game state inputs (using the outputs of the State Updater 104). In this Example 2, the conditional probabilities are hard-coded for illustrative purposes.

This Example 2 uses the pomegranate package in the Python programming language, a package that implements graphical probabilistic models. We will use pomegranate to build a graphical model and perform inference on it.

Our final goal is to compute the conditional probability distribution at each level of future at-bats. For instance, we would like to know the probability of a single on at-bat 2, conditioned on all previous at-bat outcomes.

We start by loading in specific functionality from other Python packages.

```
from pomegranate import BayesianNetwork
from pomegranate import ConditionalProbabilityTable
from pomegranate import DiscreteDistribution
from pomegranate import Node
import matplotlib.pyplot as plt
```

Figure 4:
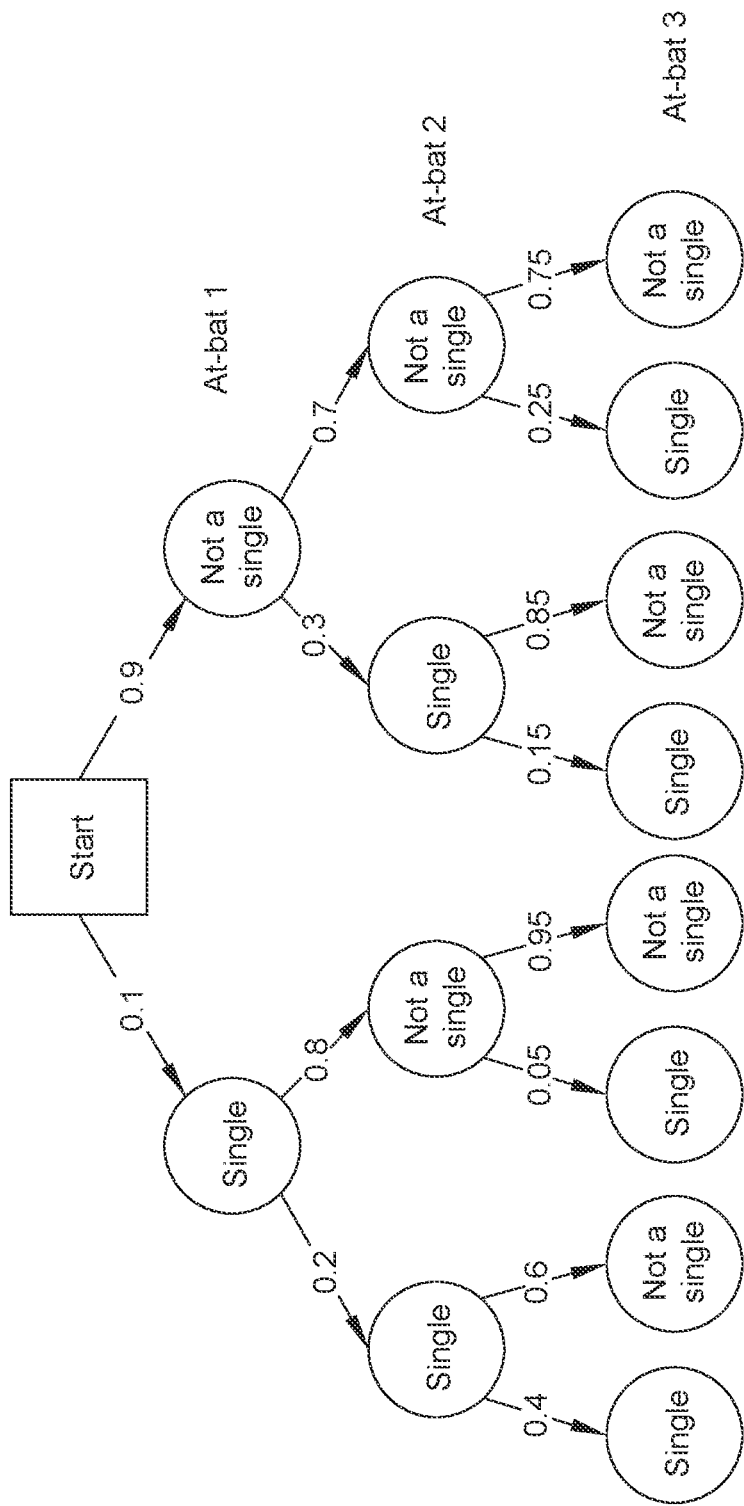
FIG. 4 is a schematic diagram of a probabilistic graphical model of a Bayesian network for predicting future at-bat results according to an embodiment.

For this Example 2, we hard-code the conditional probabilities as shown in the graph of FIG. 4 into a format that pomegranate understands. For simplicity, we'll use the convention that 0 means "single" and 1 means "not a single":

```
at_bat_1 = DiscreteDistribution({0: 0.1, 1: 0.9})
at_bat_2 = ConditionalProbabilityTable(
    [[0, 0, 0.2],
     [0, 1, 0.8],
     [1, 0, 0.3],
     [1, 1, 0.7]], [at_bat_1]
)
at_bat_3 = ConditionalProbabilityTable(
    [[0, 0, 0, 0.4],
     [0, 0, 1, 0.6],
     [0, 1, 0, 0.05],
     [0, 1, 1, 0.95],
     [1, 0, 0, 0.15],
     [1, 0, 1, 0.85],
     [1, 1, 0, 0.25],
     [1, 1, 1, 0.75]], [at_bat_1, at_bat_2]
)
```

Now that we've encoded all of the probabilities, we need to build the graphical model. Node objects hold the distributions at each level, along with a name to describe them. We can add nodes to a graph by running pomegranate's .add nodes( ) method. Likewise, we can add edges with .add_edge( ). Running .bake( ) finalizes the topology of the model and does some data formatting within the model behind the scenes:

```
model=BayesianNetwork("At-bat Network")
ab1_node=Node(at_bat_1, name="at bat_1_")
ab2_node=Node(at bat_2, name="at bat_2")
ab3_node=Node(at bat_3, name="at bat_3")
model.add_nodes(ab1_node, ab2_node, ab3_node)
model.add_edge(ab1_node, ab2_node)
model.add_edge(ab2_node, ab3_node)
model.add_edge(ab1_node, ab3_node)
model.bake( )
```

Figure 5:
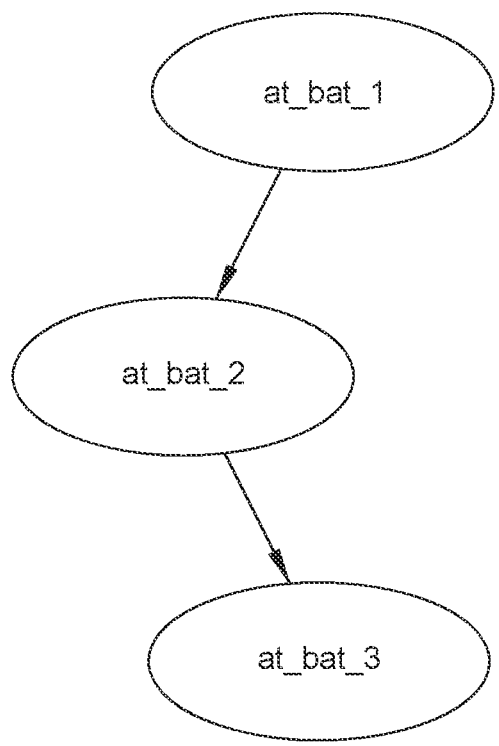
FIG. 5 is a schematic diagram of a probabilistic graphical model of a Bayesian network for predicting future at-bat results according to an embodiment

The tree diagram shown in FIG. 4 isn't actually a proper probabilistic graphical model. Each node should represent the full distribution at its layer—it should not be broken down by each possible realization from that distribution. The graphical model we created in pomegranate looks much simpler. We can plot it as shown in FIG. 5:

```
plt.figure(figsize=(5, 4))
model.plot( )
plt.show( )
```

Finally, we can compute what we want—marginal probabilities at each level of at-bats. This is as simple as running the .marginal( ) method on the model:

```
array([{
    "frozen" :false,
    "dtype" :"int",
    "class" :"Distribution",
    "parameters" :[
        {
            "1" :0.8999999999999995,
            "0" :0.10000000000000056
        }
    ],
    "name" :"DiscreteDistribution"
},
{
    "frozen" :false,
    "dtype" :"int",
    "class" :"Distribution",
    "parameters" :[
        {
            "1" :0.7099999999999997,
            "0" :0.29000000000000015
        }
    ],
    "name" :"DiscreteDistribution"
},
{
    "frozen" :false,
    "dtype" :"int",
    "class" :"Distribution",
    "parameters" :[
        {
            "1" :0.7859499999999999,
            "0" :0.21405000000000013
        }
    ],
    "name" :"DiscreteDistribution"
}], dtype=object)
```

If you manually calculate these marginal probabilities, you'll notice that the probabilities in at-bat 3 are slightly off. This is because pomegranate uses an inexact algorithm to compute them. The algorithm pomegranate uses is called "loopy belief propagation." Another Python package, pgmpy, implements an exact version of belief propagation.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed:

1. A computer-implemented system for predicting future outcomes in a sporting match of a sport of interest configured to process match state transitions using a computing device, the system comprising:
a transition machine learning (ML) model operatively configured to analyze historical match data from a specified sport and generate predicted probability distributions for various match state transitions;
a state updater comprising a meta-ML model configured to refine match state transition predictions by integrating empirical match data, and to output one or more future states based on one or more observed outcomes or trends within the sport;
a final outcome machine learning (ML) model trained on historical match data and configured to receive the one or more future states from the state updater and generate a plurality of probability distributions for specific future match outcomes based on the future states; and
a total probability predictor configured to aggregate the match state transition predictions from the transition ML model, state updater, and final outcome ML model utilizing a Bayesian network framework to synthesize and output refined probability distributions for desired match outcomes;
wherein the system is configured to execute real-time data analysis and model adjustments, dynamically responding to live match data to update predictive models, adjusting the match state transition predictions based on current match conditions and player performances,
wherein the meta-ML model is configured to process empirical data for future state extrapolation, integrating the empirical data into the Bayesian network to increase precision of predictive outcomes, and
wherein the computing device is configured to execute a series of steps, the steps comprising:
inputting an initial match state $S_0$ of the sporting match into the transition machine learning model;
generating, using the transition machine learning model, predicted probability distributions on a plurality of transition outcomes $PT_0$-$PT_i$ where i is an integer;
inputting the plurality of transition outcomes $PT_i$ into the state updater;
generating, using the state updater, a plurality of predicted probability distributions on future states, $S_1$-$S_i$, where i is an integer, conditioned on each possible transition outcome, $PT_i$;
inputting the plurality of predicted probability distributions on future states $S_i$ into the final outcome machine learning model;
generating, using the final outcome machine learning model, predicted probability distributions on a desired final outcome, $PF$;
inputting $PT_i$, $S_i$, and $PF$ into the total probability predictor; and
generating, using the total probability predictor, parameters for a Bayesian network to produce a probability distribution of a desired outcome occurring in a future match state, the generating comprising synthesizing the aggregated match state transition predictions based on association of various match state transitions, enabling the computing device to integrate probabilistic relationships among the predicted probability distributions of transition outcomes, future states, and final outcomes, to output a prediction of match developments.

2. The system of claim 1, wherein the transition machine learning model is operatively configured to predict probability distributions at a resolution matching a plurality of progression steps of the sporting match thereby enabling predictions that align with a statistically modelled progression of the sport based on historical match data.

3. The system of claim 1, wherein the meta-ML model within the state updater updates match states based on enumeration of all possible initial match state variables and outcomes from the transition machine learning model, utilizing empirical data to extrapolate expected future match states, thereby facilitating future state predictions.

4. The system of claim 1, wherein the state updater is further configured to use a ML model to predict future match states based on past match states and outcomes from the transition ML model, enabling the management of match state variables having multiple distinct values, and generation of probabilistic outcomes based on these match state variables.

5. The system of claim 1, wherein the state updater is configured to retrieve pre-computed information for constructing future match states that do not depend on current match outcomes, facilitating real-time updates to future states based on current match data.

6. The system of claim 1, wherein the final outcome ML model is configured to predict probability distributions for a desired final outcome that may be identical to the transition ML model when the system steps at the same outcome as the desired final outcome, wherein the final outcome predictions are based on the transition predictions.

7. The system of claim 1, wherein the final outcome ML model is separate from the transition ML model and configured to extrapolate from future match states to predict future outcomes different from the transition outcomes.

8. The system of claim 1, wherein the total probability predictor is configured to facilitate computation of final probability distributions using one or more resource-optimized algorithms.

9. The system of claim 1, wherein the total probability predictor is configured to facilitate computation of final probability distributions using one or more resource optimized algorithms using Monte Carlo methods for scenarios enlarging the plurality of classes in outcome variables and/or number of steps extending the predictions beyond one or more immediate next steps of the match.

10. The system of claim 1, wherein the total probability predictor uses the Bayesian network framework to synthesize predictions by capturing conditional probabilities of each possible outcome, enabling the system to output refined probability distributions for future match outcomes based on analysis of match state variables and historical data.

11. The system of claim 1, wherein the computing device is configured to iteratively execute the prediction generation process for an arbitrary number of steps into the future, performing one or more feedback loops between the transition ML model and the state updater to enable dynamic predictions extending beyond one or more immediate next steps of the match.

12. A computer-implemented method for predicting future outcomes in a sporting match of a sport of interest based on match state transitions, the method comprising:
receiving an initial match state $S_0$ of a sporting match by a transition machine learning model;
generating, by the transition machine learning (ML) model, one or more predicted probability distributions to one or more of a plurality of transition outcomes $PT_0$-$PT_i$ where i is an integer;

inputting the one or more of the plurality of transition outcomes PTi into a state updater, the state updater comprising a meta-ML model configured to refine match state transition predictions by integrating empirical match data, and to output one or more future states based on one or more observed outcomes or trends within the sport;

generating, by the state updater, a plurality of predicted probability distributions on future states, Si-Si, where i is an integer, conditioned on each possible transition outcome, PTi;

inputting the plurality of predicted probability distributions on future states Si into a final outcome machine learning model;

generating, by the final outcome machine learning model, predicted probability distributions on a desired final outcome, PF;

inputting PTi, Si, and PF into a total probability predictor; and generating, by the total probability predictor, parameters for a Bayesian network to produce a probability distribution of a desired outcome occurring in a future match state; and performing one or more feedback loops between the transition ML model and the state updater to enable dynamic predictions extending beyond one or more immediate next steps of the match, wherein the meta-ML model is configured to process empirical data for future state extrapolation, integrating the empirical data into the Bayesian network to increase the precision of predictive outcomes, and wherein the state updater is configured to execute real-time data analysis and model adjustments and dynamically respond to live match data to update predictive models, adjusting the match state transition predictions to correspond to current match conditions and player performances.

13. The method of claim 12, wherein each of the probability distributions on future states, S1-Si, generated by the state updater, represents a realization of one or more random variables.

14. The method of claim 12, further comprising outputting, by the total probability predictor, unconditional final probability distributions corresponding to the generated probability distribution of the desired outcome.

15. The method of claim 12, wherein the total probability predictor is configured to perform a exact calculation to generate the probability distribution of a desired outcome occurring in a future match state.

16. The method of claim 12, wherein the total probability predictor is configured to perform the exact calculation by:
performing matrix multiplication and linear algebra by representing the Bayesian network with tensor data structures; or (ii) representing the Bayesian network with tree data structures to generate the probability distribution of a desired outcome occurring in a future match state.

17. The method of claim 12, wherein the total probability predictor is configured to perform a non-exact approximation to generate the probability distribution of a desired outcome occurring in a future match state.

18. The method of claim 17, wherein the total probability predictor is configured to perform the non-exact approximation to generate the probability distribution by a Monte Carlo sampling algorithm.

19. A computing device for predicting future outcomes in a sporting match of a sport of interest, the computing device comprising:
a processor; and
a memory coupled to the processor, the memory storing instructions executable by the processor to:
analyze historical match data using a transition machine learning (ML) model to generate predicted probability distributions for match state transitions;
refine predictions of match state transitions using a state updater based on empirical match data, the state updater comprising a meta-ML model configured to refine match state transition predictions by integrating empirical match data, and to output one or more future states based on one or more observed outcomes or trends within the sport;
generate probability distributions for specific future match outcomes using a final outcome ML model based on future states provided by the state updater;
synthesize and output refined probability distributions for desired match outcomes by aggregating predictions from the transition ML model, the state updater, and the final outcome ML model utilizing a Bayesian network framework,
wherein the meta-ML model is configured to process empirical data for future state extrapolation, integrating this data into the Bayesian network to increase the precision of predictive outcomes, and
wherein the computing device is configured to execute real-time data analysis and model adjustments, dynamically responding to live match data to update predictive models, adjusting the match state transition predictions to correspond to current match conditions and player performances, and to perform one or more feedback loops between the transition ML model and the state updater to enable dynamic predictions extending beyond one or more immediate next steps of the match.

20. The computing device of claim 19, wherein the transition machine learning model is operatively configured to predict probability distributions at a resolution matching a plurality of progression steps of the sporting match thereby enabling predictions that align to a statistically modelled progression of the sport based on historical match data.

* * * * *